Aug. 23, 1960   M. ZION   2,949,695
TOY DUMP VEHICLE
Filed Oct. 19, 1956   3 Sheets-Sheet 1
INVENTOR
MOSES ZION
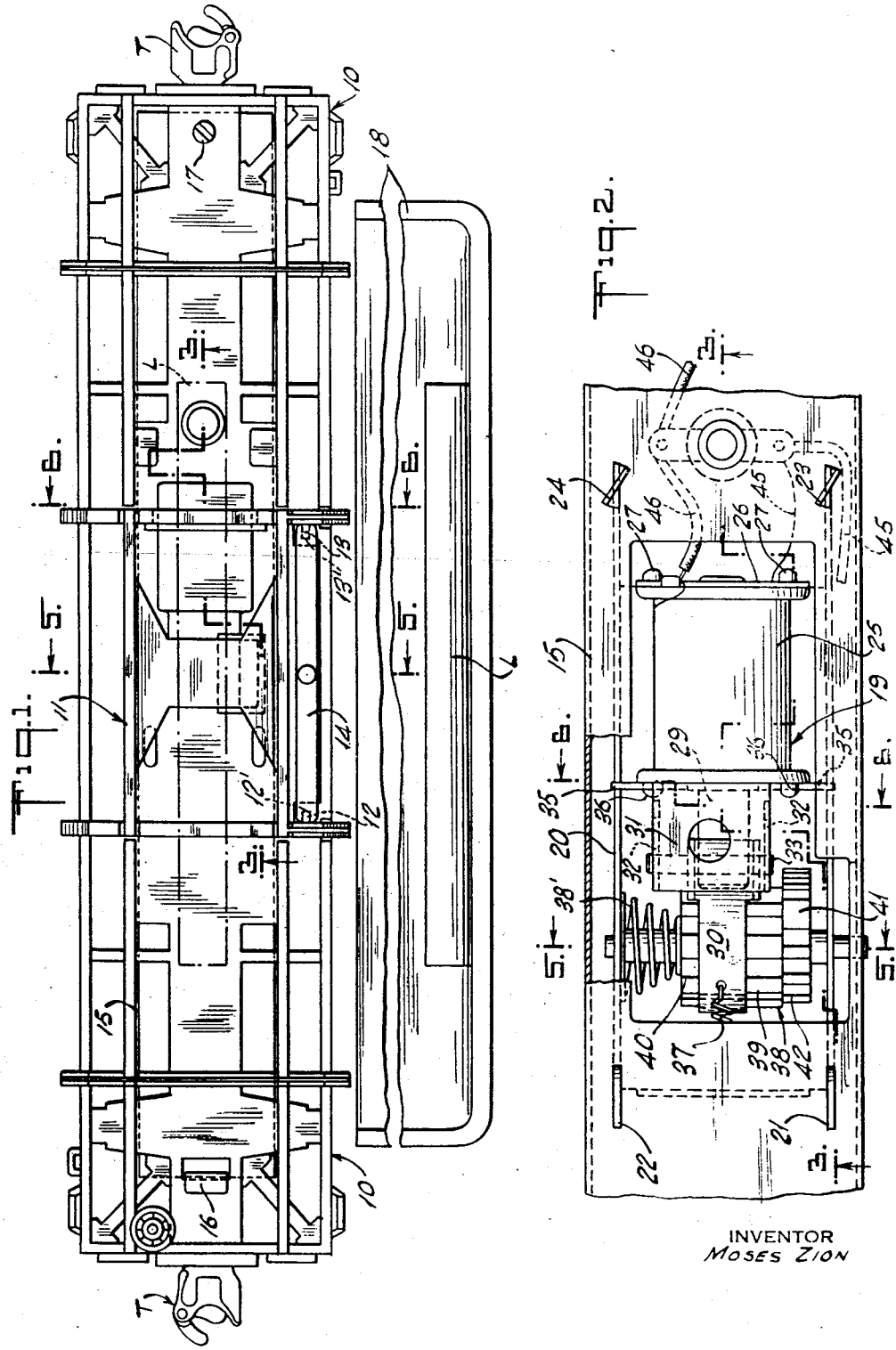

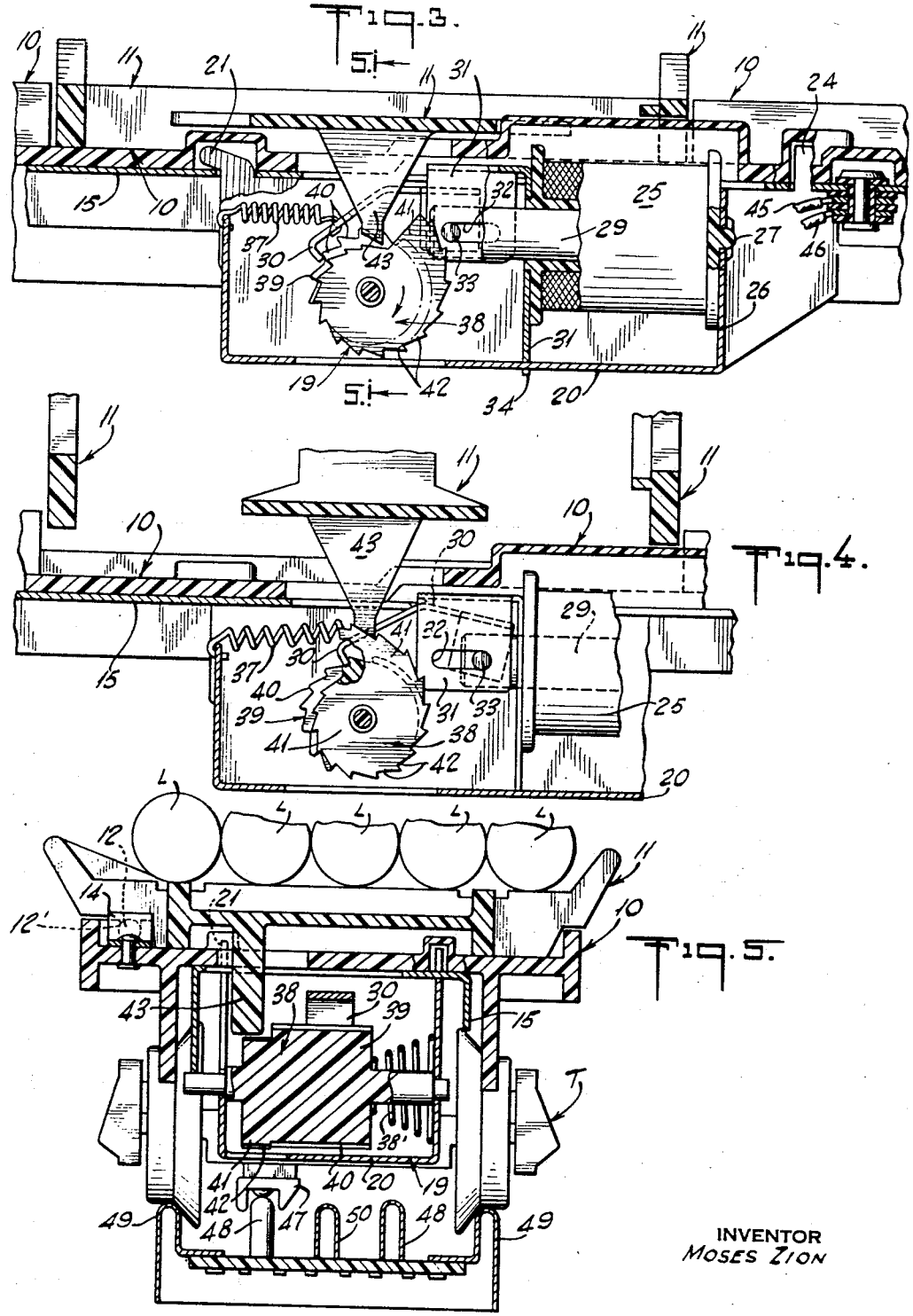

Aug. 23, 1960
M. ZION
2,949,695
TOY DUMP VEHICLE
Filed Oct. 19, 1956
3 Sheets-Sheet 3
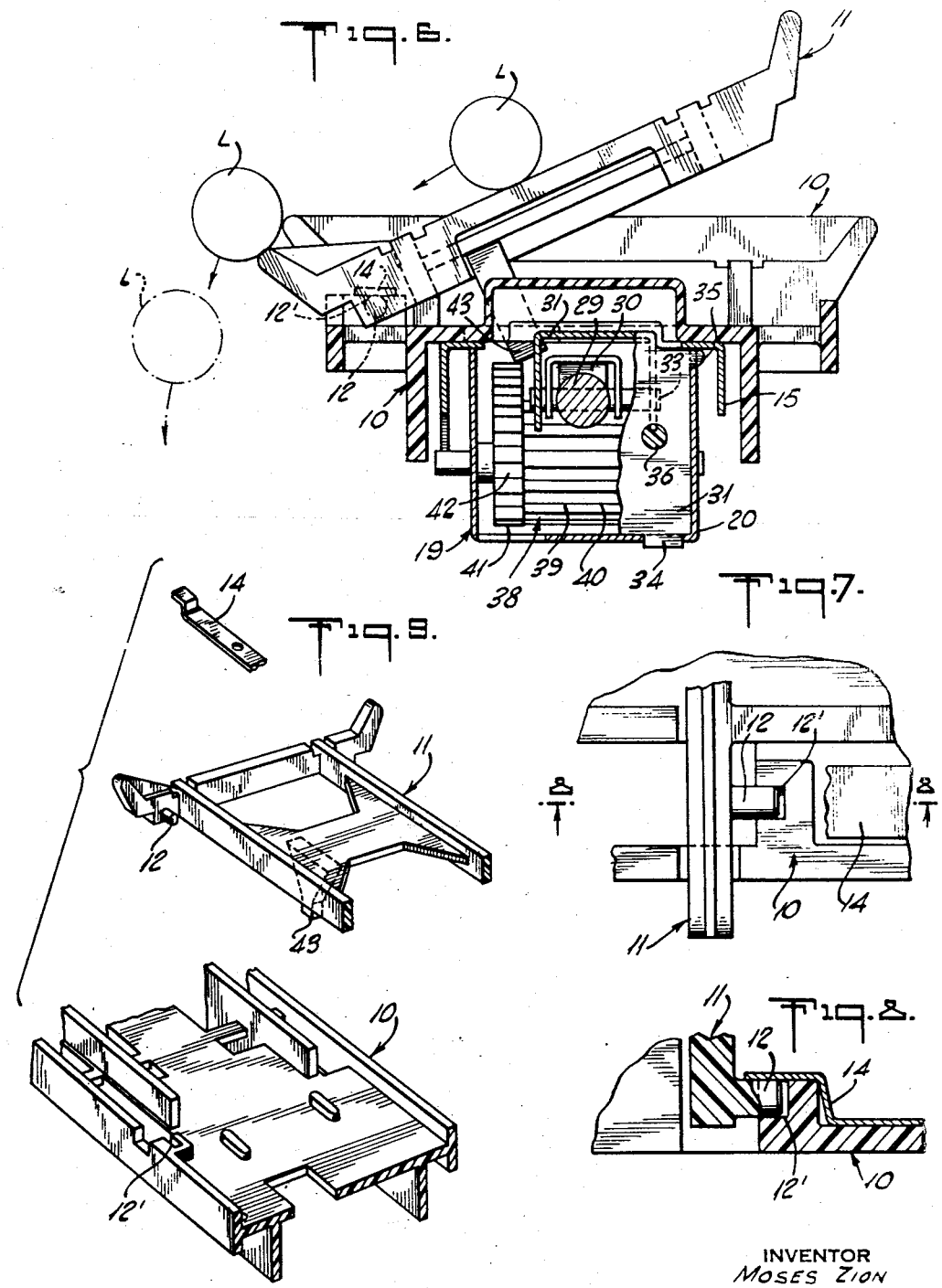
INVENTOR
MOSES ZION

United States Patent Office 2,949,695
Patented Aug. 23, 1960

2,949,695

TOY DUMP VEHICLE

Moses Zion, Brooklyn, N.Y., assignor to The Lionel Corporation, New York, N.Y., a corporation of New York Filed Oct. 19, 1956, Ser. No. 616,978

3 Claims. (Cl. 46—243)

This invention relates to toy railroad vehicles and more specifically to a remotely controlled car for unloading articles carried by the car.

One object of the invention resides in the provision of an improved remotely controlled car for unloading simulated logs and other articles.

Another object of the invention resides in a new and improved arrangement of elements operable in a series of steps for unloading articles from a car and for returning the elements to a normal loading position.

Still another object of the invention is a new and improved device for tilting a portion of a car body to automatically unload articles such as logs and other cylindrical objects therefrom.

A further object of the invention is a novel and improved flat car and log retaining and unloading mechanism.

A still further object of the invention resides in the provision of a novel and improved cam and cooperating electromechanical means for rotating said cam.

The above and other objects and advantages of the invention will become more apparent from the following description and accompanying drawings forming part of this application.

In the drawings:

Figure 1 is a plan view of a car in accordance with the invention;

Figure 2 is a fragmentary plan view of the truck frame of the car of Figure 1 with the car body removed and parts broken away;

Figure 3 is a cross sectional view of Figures 1 and 2 taken along the lines 3—3 thereof with the dump frame in the lowered position;

Figure 4 is a slightly enlarged view similar to Figure 3 with the dump frame in the raised position;

Figure 5 is a cross sectional view of Figures 1 and 2 taken along the line 5—5 thereof with the dump frame in the lowered position;

Figure 6 is a cross sectional view of Figures 1 and 2 taken along the line 6—6 thereof with the dump frame in the raised position;

Figures 7 and 8 are fragmentary views of Figure 1 enlarged to show pivotal attachment of the truck frame to the car body; and Figure 9 is an exploded perspective view of fragmentary parts of the dump frame and car body.

Referring now to the drawings and more specifically to Figure 1 showing a plan view of a toy railroad car in accordance with the invention, the numeral 10 denotes the car body simulating a substantially flat lumber car. A dump frame 11 is disposed centrally of the body 10 and is hinged to the body by a pair of trunnions 12 and 13 held in cooperating grooves 12′ and 13′ by a spring clip 14 (see Figs. 1, 7, 8 and 9). The car body is supported by an inverted channel member or truck frame 15 carried by at least two track engaging trucks T, one of which is shown in Fig. 5. The body 10 is secured to the truck frame 15 by clip 16 on one end of the body and a screw 17 passing through the body and engaging the truck frame 15. A tray 18 is disposed alongside the car to receive logs L as they are dumped from the car by tilting of the dump frame.

Operation of the dump frame 11 is accomplished by a novel and improved actuator generally denoted by the numeral 19 that tilts the dump frame in a series of steps controlled by a remote push button. More specifically, the actuator 19 is enclosed within a housing 20 attached to the underside of the truck frame 15 by slot engaging tabs 21, 22, 23 and 24, and is actuated by a series of electric pulses to move the dump frame to its fully raised position.

The mechanism of the actuator includes a coil 25 secured to the end plate 26 of housing 20 and held against rotation by bosses 27 on coil 25 and cooperating openings in the plate 26. A plunger 29 is slidably disposed within the coil 25 and pivotally carries a pawl 30 on the outer end thereof. Longitudinal displacement of the pawl 30 is controlled by a pawl bracket 31 having slots 32 for receiving the pawl connecting pin 33.

The pawl bracket 31 is held in place within the housing 20 by housing engaging ears 34 and 35. It also provides front support for coil 25 by means of the engagement of coil bosses 36 with cooperating openings in the pawl bracket. A spring 37 biases the pawl and plunger forwardly and downwardly, as shown in Figs. 3 and 4, for cooperation with the ratchet and dump frame lift cam assembly 38, the latter being rotatably carried by the frame member or housing 20. The ratchet 39 of the assembly 38 is generally cylindrical having a plurality of ratchet teeth 40 coordinated with the pawl magnitude of the displacement controlled by slots 32 of the pawl bracket 31.

The dump frame lift cam 41 constitutes a portion of a spiral having teeth 42 to successively engage the triangularly shaped member or cam follower 43 carried by the lift frame 11. Thus as the coil 25 is periodically energized the ratchet 39 is moved in clockwise steps from a position as viewed in Fig. 3 to a position as viewed in Fig. 4. This action produces corresponding rotation of the lift cam 41 to raise the dump frame 11. The raised position of the dump frame is shown in Figs. 4 and 6 for discharging logs L. When the coil 25 is again energized, after the dump frame has attained maximum tilt, the cam 41 is shifted to permit the dump frame to drop into the lowered position as shown in Figs. 3 and 6. The ratchet and cam assembly 38 is held in alignment with the pawl 30 and cam follower 43 by a spring 38′, that also functions as a slip clutch to prevent reverse rotation of the assembly 38.

Energization of the coil 25 may be accomplished in any desired manner. In the illustrated embodiment of the invention, the coil leads 45 and 46 are connected to contacts or collectors 47 on the trucks T and arranged to engage special rails 48 disposed between the load bearing rails 49 of the track and the center rail 50 (see Fig. 5). With this arrangement, the application of energy to the rails 48 will energize the coil 25. Any form of control means may be used to apply energy to the pair of rails 48, as for instance a remotely located push button connected in series with a suitable source of energy.

With the invention as described above, the successive stepping of the ratchet and cam assembly 38 by successive operation of a suitable push button affords maximum play value and reality and at the same time constitutes a dependable, inexpensive lift mechanism. Moreover, the improved mounting of the lift or dump frame 11 on the body 10 and its cooperation with the actuator 19 enables the dump frame to be operated automatically or manually, as may be desired.

While only one embodiment of the invention has been shown and described, it is understood that modifications, alterations and changes may be made without departing from the true scope and spirit thereof.

What is claimed is:

1. A toy vehicle comprising an elongated frame, wheels carried by said frame, a vehicle body secured to said frame, article retaining means pivoted to one edge of said body and movable from a substantially horizontal position to a tilted position for discharging said articles, a cam follower carried by said frame and engageable with said article retaining means for tilting said article retaining means, an eccentric cam ratchet gear rotatably mounted in said frame and supporting said cam follower, a pawl for rotating said ratchet gear, a plunger magnet coupled with said pawl for moving it in one direction upon energization to rotate said gear and spring means for moving the pawl in the other direction upon de-energization of the magnet.

2. A vehicle comprising a car body, a dump frame disposed centrally above said body and movably hinged at one side to said body, a ratchet cam rotatably mounted on said body, a cam follower supporting said frame and in engagement with said ratchet cam, a solenoid supported by said body, indexing means connected to said ratchet cam and to said solenoid and means to energize said solenoid to index said ratchet cam and to incrementally tilt said dump frame.

3. A toy electric railroad vehicle comprising a car body, a dump frame having a longitudinal side hinged to said car body, a cam follower carried by said frame, a spiral ratchet cam member rotatably supported by said body and having a ratchet portion and a cam portion, said cam portion actuating said cam follower, electromagnetic coil means supported by said body, a plunger slidably disposed within said coil means for reciprocating motion, a pawl pivotally carried by said plunger and engaging said ratchet portion of said ratchet cam member, a spring biasing said plunger and said pawl for cooperating with said ratchet cam member and means to actuate said electromagnetic coil means to index said ratchet cam member and to raise said dump frame.

References Cited in the file of this patent

UNITED STATES PATENTS

| | | |
|---|---|---|
| 1,595,510 | Fischer | Aug. 10, 1926 |
| 2,305,491 | Pettit | Dec. 15, 1942 |
| 2,658,307 | Pettit | Nov. 10, 1953 |
| 2,682,004 | Schulenburg | June 22, 1954 |
| 2,779,881 | Lundquist | Jan. 29, 1957 |

FOREIGN PATENTS

| | | |
|---|---|---|
| 946,125 | Germany | July 26, 1956 |